(12) United States Patent
Overley et al.

(10) Patent No.: US 9,932,179 B2
(45) Date of Patent: Apr. 3, 2018

(54) METHODS FOR TRANSFERRING ITEMS

(71) Applicant: The Procter & Gamble Company, Cincinnati, OH (US)

(72) Inventors: Matthew Bernard Overley, Deerfield Township, OH (US); Gustav Andre Mellin, Amberley Village, OH (US); Wesley Bernard Brokopp, Jr., Middletown, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 25 days.

(21) Appl. No.: 15/013,113

(22) Filed: Feb. 2, 2016

(65) Prior Publication Data

US 2016/0145052 A1 May 26, 2016

Related U.S. Application Data

(62) Division of application No. 13/613,919, filed on Sep. 13, 2012, now Pat. No. 9,205,994.

(60) Provisional application No. 61/536,220, filed on Sep. 19, 2011.

(51) Int. Cl.
| | |
|---|---|
| *B65G 29/00* | (2006.01) |
| *B65G 47/00* | (2006.01) |
| *B65G 47/02* | (2006.01) |
| *B65G 47/08* | (2006.01) |
| *B65B 25/14* | (2006.01) |
| *B65B 35/46* | (2006.01) |

(52) U.S. Cl.
CPC .......... *B65G 47/088* (2013.01); *B65B 25/146* (2013.01); *B65B 35/46* (2013.01); *B65G 29/00* (2013.01); *B65G 47/082* (2013.01); *B65G 2201/0232* (2013.01)

(58) Field of Classification Search
None
See application file for complete search history.

(56) References Cited

U.S. PATENT DOCUMENTS

| | | | |
|---|---|---|---|
| 3,877,562 A | 4/1975 | Shaw | |
| 3,967,717 A | 7/1976 | Bauer | |
| 4,063,632 A | 12/1977 | Neth et al. | |

(Continued)

FOREIGN PATENT DOCUMENTS

| | | |
|---|---|---|
| AU | 2002235960 A1 | 9/2002 |
| EP | 0 093 015 | 11/1983 |

(Continued)

OTHER PUBLICATIONS

All Office Actions in U.S. Appl. No. 13/613,919.
All Office Actions in U.S. Appl. No. 13/613,970.

*Primary Examiner* — Kavel Singh
(74) *Attorney, Agent, or Firm* — Andrew J. Mueller

(57) ABSTRACT

A method of transferring items, such as rolled absorbent product. The method includes the steps of feeding one or more input streams of items toward a turret having a longitudinal axis and arms for engaging the items, the arms being rotatable about the longitudinal axis. The arms can engage at least one of the items from at least one of the one or more input streams and rotate away from the input streams and into a position aligned with one or more output streams. The number of input streams can be different than the number of output streams. The items can be fed onto the one or more output streams.

8 Claims, 15 Drawing Sheets

(56) References Cited

U.S. PATENT DOCUMENTS

| | | | |
|---|---|---|---|
| 4,164,997 | A | 8/1979 | Mueller |
| 4,180,154 | A | 12/1979 | Andersson |
| 4,218,863 | A | 8/1980 | Howard et al. |
| 4,267,917 | A | 5/1981 | Vogel |
| 4,549,647 | A | 10/1985 | Cosse |
| 4,624,096 | A | 11/1986 | Nordstrom |
| 4,651,500 | A | 3/1987 | Chaffey |
| 4,874,078 | A | 10/1989 | Meyer |
| 4,880,102 | A | 11/1989 | Indrebo |
| 4,889,223 | A | 12/1989 | Bergstrom |
| 5,024,315 | A | 6/1991 | Ward |
| 5,038,549 | A | 8/1991 | Nordstrom |
| 5,113,996 | A | 5/1992 | Francioni |
| 5,176,244 | A | 1/1993 | Radzins et al. |
| 5,191,964 | A | 3/1993 | Spisak et al. |
| 5,385,226 | A | 1/1995 | Weinert |
| 5,768,856 | A | 6/1998 | Odenthal |
| 5,873,450 | A | 2/1999 | Rusch et al. |
| 5,946,884 | A | 9/1999 | Nordstrom et al. |
| 5,979,634 | A | 11/1999 | Odegard et al. |
| 5,987,847 | A | 11/1999 | Nordstrom et al. |
| 6,062,845 | A | 5/2000 | Conaway et al. |
| 6,371,278 | B1 | 4/2002 | Hart et al. |
| 6,463,713 | B1 | 10/2002 | Ruemeli |
| 6,619,017 | B2 | 9/2003 | Franzoroli |
| 6,733,224 | B1 | 5/2004 | Linner |
| 7,059,466 | B2 * | 6/2006 | Lees ............... B65B 3/025 198/474.1 |
| 7,114,609 | B2 | 10/2006 | Christman et al. |
| 7,308,779 | B2 | 12/2007 | Benz |
| 7,744,139 | B1 | 6/2010 | Kalisch et al. |
| 7,797,913 | B2 | 9/2010 | Gorrieri et al. |
| 7,810,630 | B2 | 10/2010 | Duchmin et al. |
| 8,002,105 | B2 | 8/2011 | Duchemin et al. |
| 8,151,971 | B2 * | 4/2012 | Baldanza ............. B65G 47/252 198/408 |
| 2005/0166552 | A1 | 8/2005 | Omo et al. |
| 2007/0137144 | A1 | 6/2007 | Dall et al. |
| 2007/0227858 | A1 | 10/2007 | Aoyama et al. |
| 2008/0264759 | A1 | 10/2008 | Mignano |
| 2013/0068589 | A1 | 3/2013 | Overley et al. |
| 2013/0068591 | A1 | 3/2013 | Overley et al. |

FOREIGN PATENT DOCUMENTS

| | | |
|---|---|---|
| EP | 615929 A1 | 9/1994 |
| EP | 648696 A1 | 4/1995 |
| EP | 1312549 A1 | 5/2003 |
| EP | 12223107 B1 | 8/2004 |
| EP | 1990294 A1 | 11/2008 |
| GB | 2137918 | 10/1984 |
| GB | 2143487 | 2/1985 |
| GB | 2255762 | 11/1992 |
| GB | 2302677 A | 1/1997 |
| GB | 2471298 | 12/2010 |
| JP | 2002253606 | 9/2002 |
| JP | 2007238200 | 9/2007 |
| WO | WO 8602340 A1 | 4/1986 |

* cited by examiner

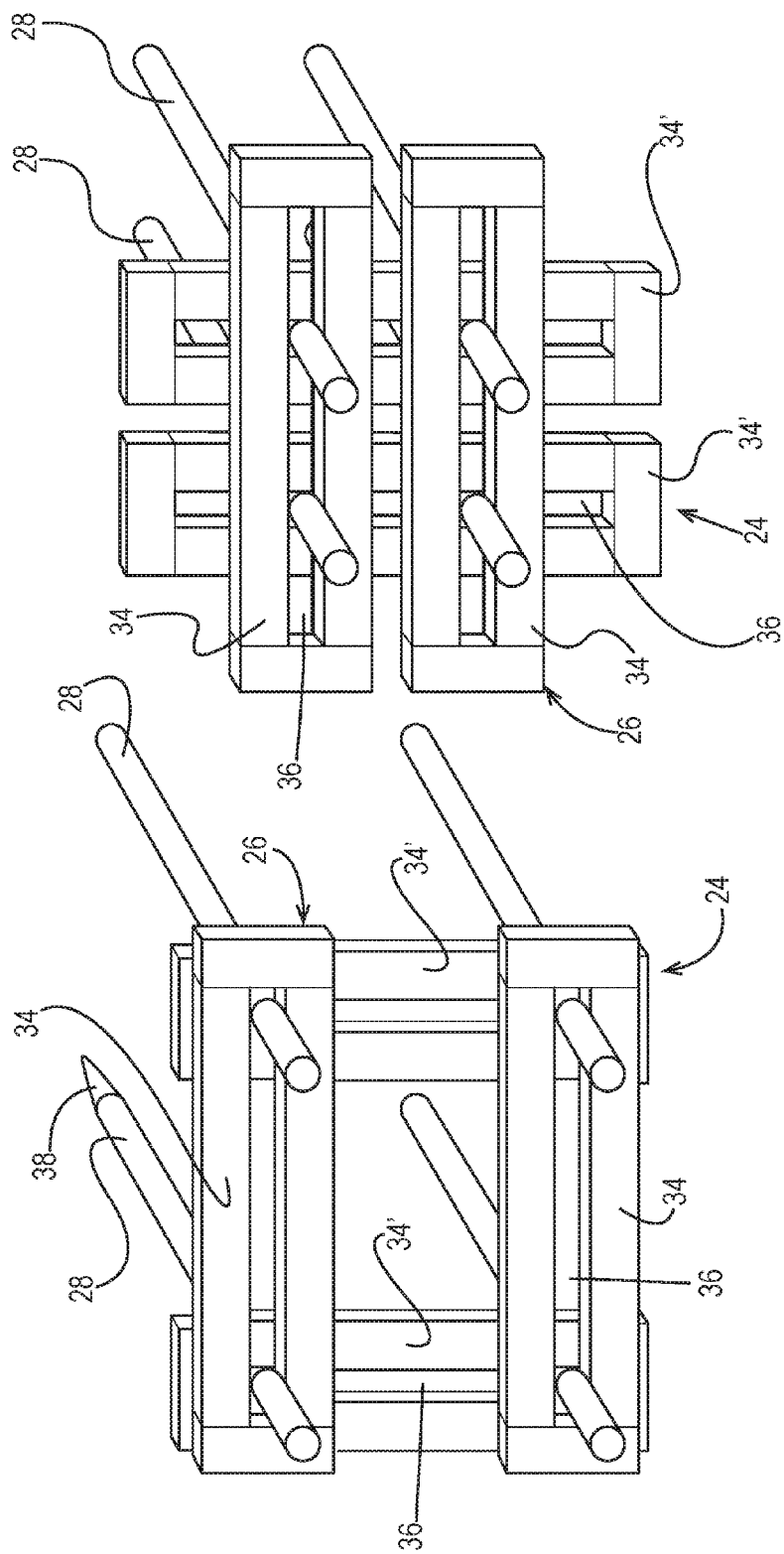

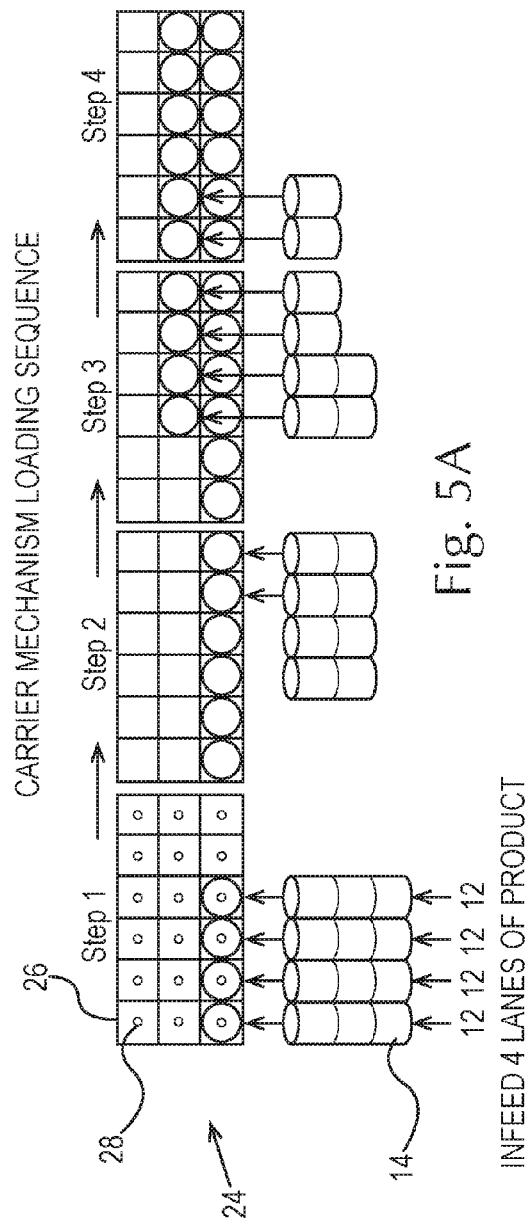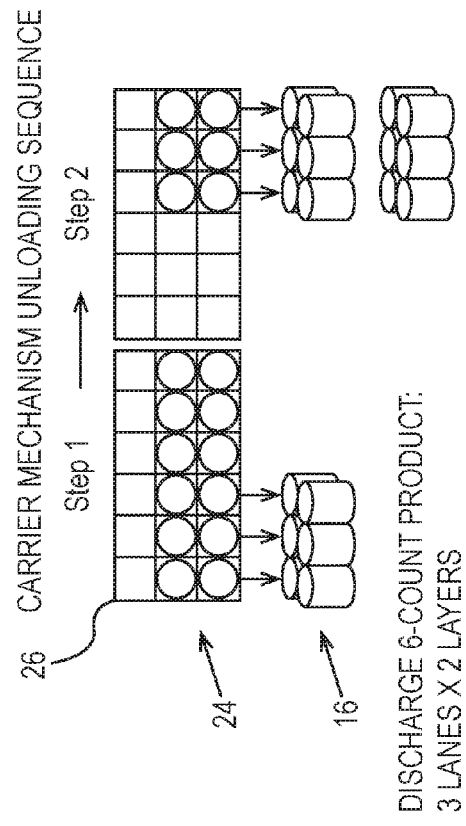
Fig. 5A
Fig. 5B

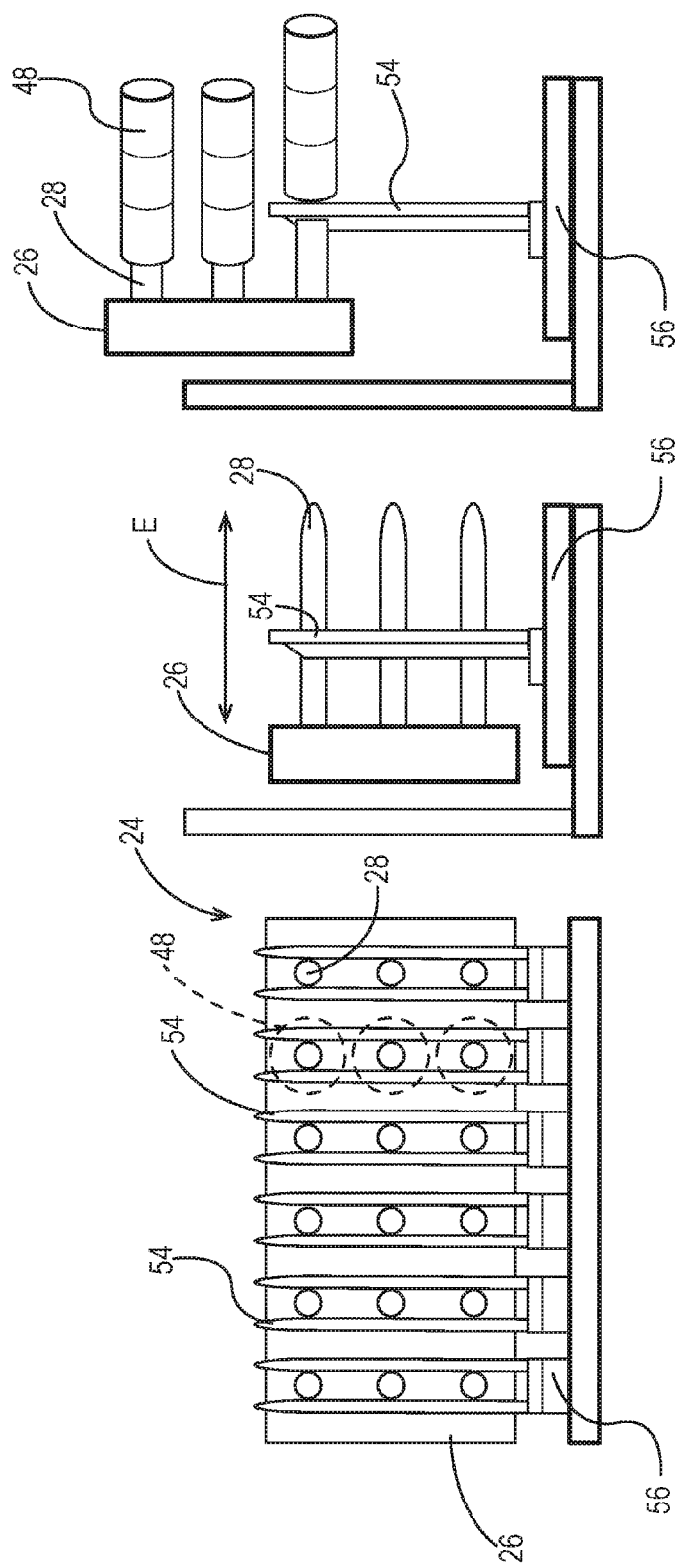

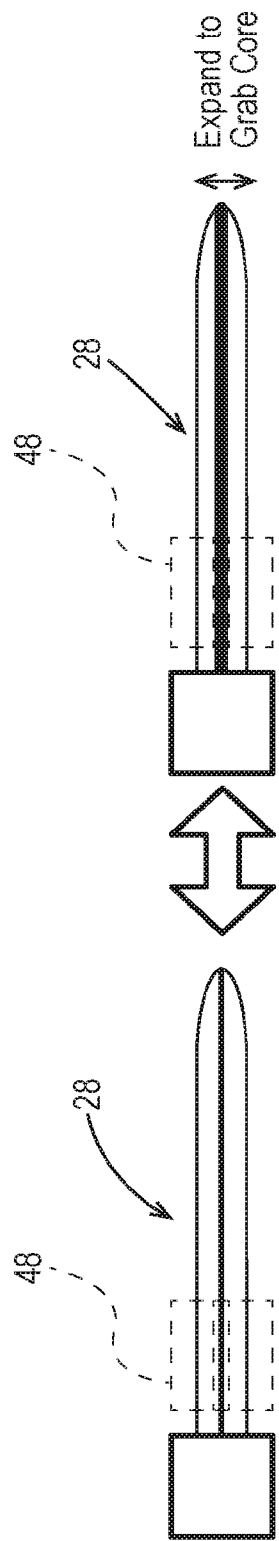
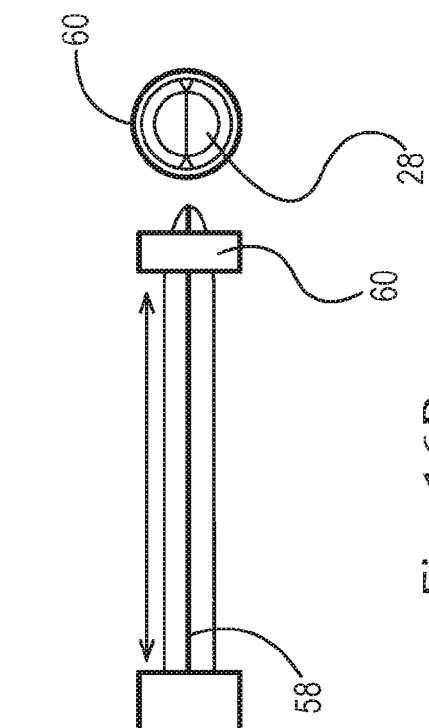
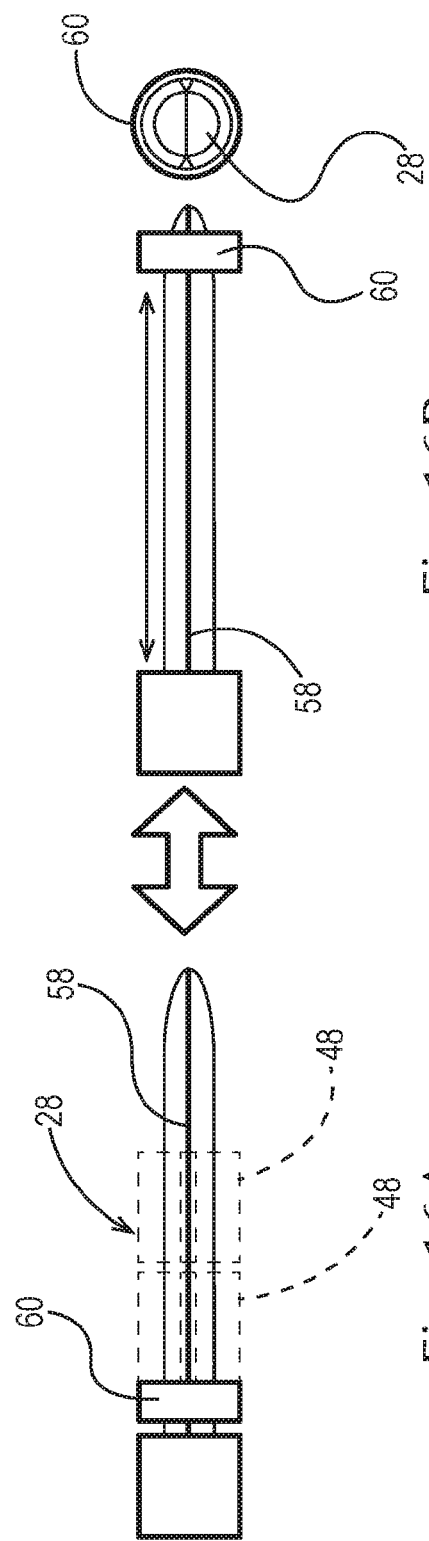

METHODS FOR TRANSFERRING ITEMS

CROSS REFERENCE TO RELATED APPLICATION(S)

This application is a Divisional of application Ser. No. 13/613,919 filed Sep. 13, 2012; which claims the benefit of U.S. Provisional Application No. 61/536,220, filed Sep. 19, 2011.

FIELD

The present disclosure generally relates to methods for transferring items, and more particularly, relates to methods for transferring items between one or more input streams and one or more output streams.

BACKGROUND

During manufacturing processes, it is often necessary to group, orient, arrange, and/or sort items for packaging or for other downstream operations. Such operations can be cumbersome if the items do not have flat sides, do not fit together in an orderly fashion, and/or if the items are hard to control (e.g., the products do not remain stationary on a flat conveyor), for example. Currently technologies use guide rails, stacking apparatuses, grouping apparatuses, and/or layering devices, for example, to handle the items. These technologies usually engage outer surfaces of the items during handling. Such current technologies have drawbacks, such as complexity. Further, current technologies usually do not provide great process flexibility and may be a limiting factor in production rates. In some instances, manufacturing equipment can be designed to be quite complex and perform a great number of functions or can be designed to be simpler and only perform limited number of functions. It would be beneficial to provide methods and mechanisms for transferring items that improve the state of the art, do not damage the outer surface of the items, do not limit the production rate of a manufacturing line, and provide for great flexibility in a manufacturing process.

SUMMARY

A method of transferring items, such as rolled absorbent product, is disclosed. The method includes the steps of feeding one or more input streams of items toward a turret having a longitudinal axis and arms for engaging the items, the arms being rotatable about the longitudinal axis. The arms can engage at least one of the items from at least one of the one or more input streams and rotate away from the input streams and into a position aligned with one or more output streams. The number of input streams can be different than the number of output streams. The items can be fed onto the one or more output streams.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein:

FIG. 4A is a perspective view of a carrier mechanism comprising a base and a plurality of rods extending from the base in accordance with one non-limiting embodiment;

FIG. 4B is another perspective view of a carrier mechanism having a base and a plurality of rods extending from the base in accordance with one non-limiting embodiment;

FIG. 5A is an example loading sequence of a carrier mechanism in accordance with one non-limiting embodiment;

FIG. 5B is an example unloading sequence of the carrier mechanism of FIG. 5A in accordance with one non-limiting embodiment;

FIG. 14A is an end view of a pusher apparatus configured to disengage items from a carrier mechanism in accordance with one non-limiting embodiment;

FIG. 14B is a side view of the pusher apparatus of FIG. 14A in accordance with one non-limiting embodiment;

FIG. 14C is another side view of the pusher apparatus of FIG. 14A in accordance with one non-limiting embodiment;

FIGS. 15A and 15B are side views of an expanding rod configured for use with the carrier mechanism of the present disclosure in accordance with various non-limiting embodiments; and FIGS. 16A and 16B are side views of a rod engaged with a movable collar configured for use with the rods of the carrier mechanism in accordance with various non-limiting embodiments.

DETAILED DESCRIPTION

Figure 1:
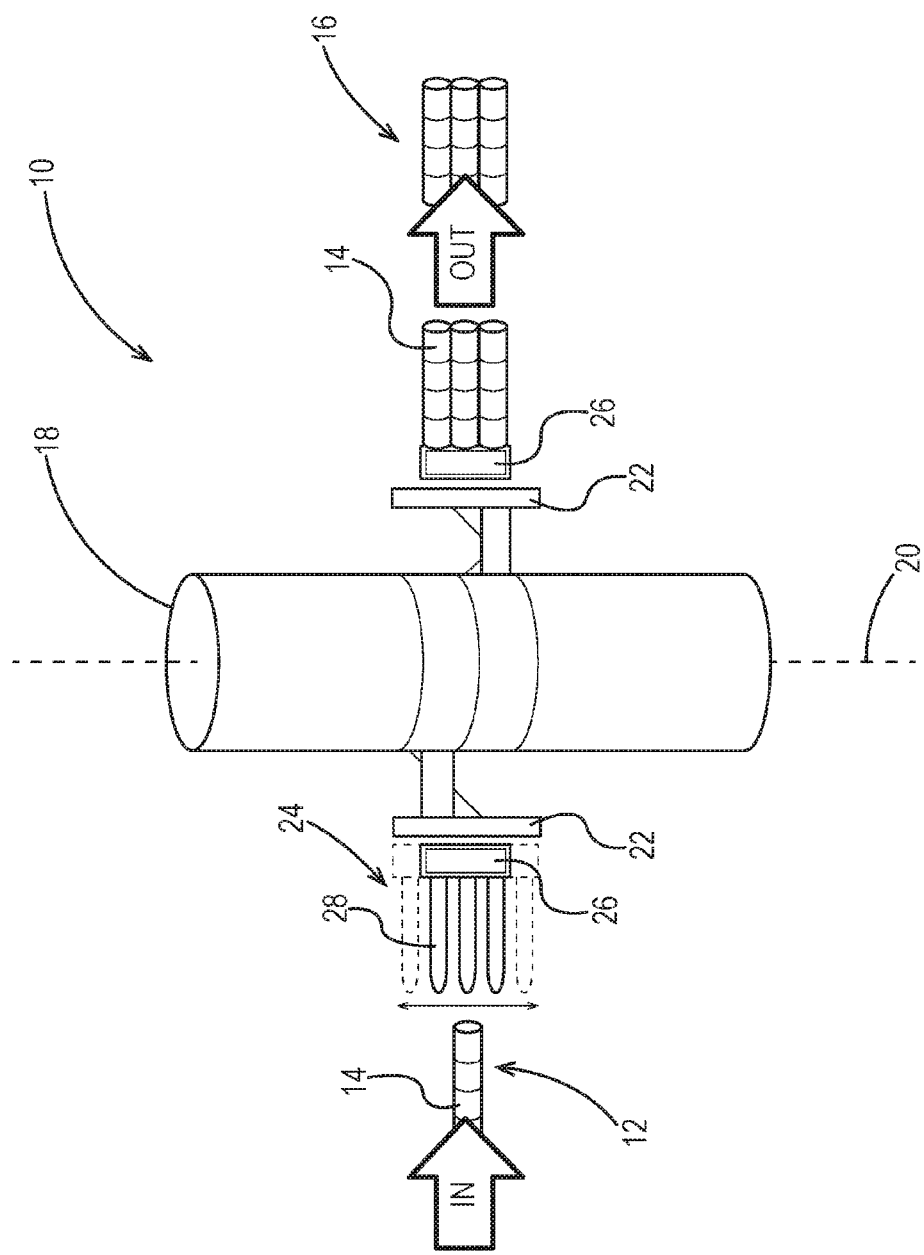
FIG. 1 is a perspective illustration of a transfer mechanism transferring items between an input stream and an output stream in accordance with one non-limiting embodiment.

Various non-limiting embodiments of the present disclosure will now be described to provide an overall understanding of the principles of the structure, function, manufacture, and use of the methods and mechanisms for transferring items disclosed herein. One or more examples of these non-limiting embodiments are illustrated in the accompanying drawings. Those of ordinary skill in the art will understand that the methods and mechanisms for transferring items described herein and illustrated in the accompanying drawings are non-limiting example embodiments and that the scope of the various non-limiting embodiments of the present disclosure are defined solely by the claims. The features illustrated or described in connection with one non-limiting embodiment can be combined with the features of other non-limiting embodiments. Such modifications and variations are intended to be included within the scope of the present disclosure.

"Fiber" as used herein means an elongate physical structure having an apparent length greatly exceeding its apparent diameter (i.e. a length to diameter ratio of at least about 10.) Fibers having a non-circular cross-section and/or tubular shape are common; the "diameter" in this case can be considered to be the diameter of a circle having cross-sectional area equal to the cross-sectional area of the fiber. More specifically, as used herein, "fiber" refers to fibrous structure-making fibers. The present disclosure contemplates the use of a variety of fibrous structure-making fibers, such as, for example, natural fibers or synthetic fibers, or any other suitable fibers, and any combination thereof.

"Fibrous structure" as used herein means a structure that comprises one or more fibers. Nonlimiting examples of processes for making fibrous structures include known wet-laid papermaking processes and air-laid papermaking processes. Such processes typically comprise the steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure can be carried out such that a finished fibrous structure is formed. For example, in typical papermaking processes, the finished fibrous structure is the fibrous structure that is wound on the reel at the end of papermaking and can subsequently be converted into a finished product (e.g. a sanitary tissue product).

"Sanitary tissue product" as used herein means one or more finished fibrous structures, converted or not, that is useful as a wiping implement for post-urinary and post-bowel movement cleaning (e.g., toilet tissue and wet wipes), for otorhinolaryngological discharges (e.g., facial tissue), and multi-functional absorbent and cleaning uses (e.g., paper towels). The sanitary tissue products can be embossed or not embossed and creped or uncreped.

In various embodiments, transfer mechanisms that can transfer one or more items from one or more input streams or conveyors (together referred to herein as "streams") to one or more output streams are provided by the present disclosure. Methods of transferring one or more items between one or more input streams and one or more output streams are also provided. The transfer mechanisms can each comprise a turret (or other rotating member), optionally one or more arms, and one or more carrier mechanisms. The one or more arms can extend from the turret and the one or more carrier mechanisms can extend from the arms. In one embodiment, the arms can be eliminated and the carrier mechanisms can be engaged with and/or extend from the turret. The turret can rotate to move the arms and the carrier mechanism or the arms and the carrier mechanism can rotate about the turret. In other various embodiments, a robot, for example, can be used in place of the turret to move and/or rotate the one or more carrier mechanisms.

In various embodiments, the transfer mechanisms of the present disclosure can be configured to transfer a plurality of items between one or more input streams and one or more output streams. Such items can include, but are not limited to, sanitary tissue products, rolls of sanitary tissue products, packaged sanitary tissue products—whether packaged in paperboard containers or films, rolls of wet wipes or cleaning wipes, bottles, containers, diapers, and sanitary napkins, for example.

In one embodiment, referring to FIG. 1, an example transfer mechanism 10 is illustrated. The transfer mechanism 10 is configured to receive one or more input streams 12 of items 14 and transfer the items 14 to one or more output streams 16 of the items 14. The transfer mechanism 10, or portions thereof, such as a carrier mechanism, for example, can manipulate, rotate, and/or move any suitable distance or rotational degree (e.g., an output stream can be positioned 160 degrees from an input stream) such that the items 14 can be transferred from the input stream 12 to the output stream 16. This can allow for better process flow or manufacturing facility floor space management. In various embodiments, the configuration or arrangement of the items 14 in each input stream 12 can be different than the configuration or arrangement of the items 14 in each output stream 16. For example, each input stream 12 can have 1 item three rows deep while an output stream 16 can have three columns of items 14, 2 rows deep, and 3 rows wide.

In one embodiment, still referring to FIG. 1, the transfer mechanism 10 can comprise a turret 18. The turret 18 can be fixed in a non-rotatable or non-moveable position or can be moveable and/or rotatable through the use of actuators. Any other suitable mechanism for moving and/or rotating one or more carrier mechanisms or having the same rotate about it can be used in place of the turret 18. The turret 18 can have a longitudinal axis 20. One or more arms 22 can extend from the turret 18 and/or can be attached to the turret 18. Each of the arms 22 can be fixedly or rigidly attached to the turret 18. In such an embodiment, the turret 18 can rotate about its longitudinal axis 20 through the use of one or more actuators to manipulate or rotate the arms 22. In other various embodiments, the arms 22 can be rotatably attached to the turret 18 and can rotate about the longitudinal axis 20 and relative to the fixed turret 18. In such an embodiment, the arms 22 can be operably engaged with one or more actuators (not illustrated) configured to rotate the arms 22 about the turret 18. The actuator can be a motor operably coupled to a drive chain or belt or a rack and pinion system. The arms 22, whether rotated by the turret 18 or rotated about the turret 18, can make a full revolution (i.e., 360 degree movement) about the turret 18. In other embodiments, the arms 22 may only make a partial revolution about the turret 18 (e.g., 180 degrees). In one embodiment, the arms 22 can rotate in the clockwise direction and/or in the counter-clockwise direction about the longitudinal axis 20 of the turret 18. Although two arms 22 are illustrated in FIG. 1, one arm 22 can be provided or more than two arms 22 can be provided on a single turret 18. In other various embodiments, the arms 22 can be positioned around, or around at least a portion of, the circumference or perimeter of the turret 18. In various embodiments, if two or more of the arms 22 are provided on the turret 18, the arms 22 can be positioned on the turret 18 at different heights on the turret 18 so as to allow the arms 22 to rotate about the turret 18 independent of the position of another arm 22. In other various embodiments, if two or more of the arms 22 are provided on the turret 18, the arms 22 can be positioned at the same height on the turret 18. Each of the arms 22 can be formed with a carrier mechanism 24 or can be engaged with the carrier mechanism 24. In an embodiment comprising two of the arms 22 (each engaged with a carrier mechanism 24) at different heights on the turret 18, the transfer mechanism can transfer items 14 from a first input stream 12 at a first height on the turret 18 and discharge the items 14 onto an output stream 16 at the first height using the first arm 22 and the first carrier mechanism 24 and can transfer items 14 from a second input stream 12 at a second height on the turret 18 and discharge the items 14 onto an output stream 16 at the second height using the second arm 22 and the second carrier mechanism 24.

In one embodiment, still referring to FIG. 1, the carrier mechanism 24 can be engaged with or formed with the one or more arms 22 or attached directly to the turret 18. The carrier mechanism 24 can comprise a base 26 and a plurality of rods 28 extending from the base 26 and/or operably engaged with the base 26 through the use of one or more actuators. Additional details regarding the rods 28 are discussed below. In other embodiments, the rods 28 may not be provided and the base 26 can comprise a plurality of item receiving areas or spaces and/or item receiving shelves. The item receiving areas or spaces and/or the item receiving shelves can be adjustable in size or spacing such that they can be configured to receive items 14 having different dimensions. For example, a first shelf may be movable relative to a second shelf to receive an item 14 having larger or smaller dimensions. In one embodiment, the shelves can be configured to receive items that are bottles, containers, and/or sanitary tissue products. In such an embodiment, once the shelves receive the bottles, containers, and/or sanitary tissue products, at least one shelf can move relative to another shelf to apply a force to the bottles, containers, and/or sanitary tissue products to aid in retaining the bottles, containers, and/or sanitary tissue products on the carrier mechanism 24 during rotation, manipulation, or movement of the carrier mechanism 24 (e.g., movement between one or more input streams and one or more output streams). The bottles, containers, and/or sanitary tissue products can be removed from the shelves and discharged onto an output stream using a pusher apparatus, such as a linear actuator, for example. The pusher apparatus can engage the bottles, containers, and/or sanitary tissue products and essentially push or force them onto the output stream. Other mechanisms or areas can also be provided on the base 26 for receiving other items. In one embodiment, the receiving areas or spaces and/or the item receiving shelves can each comprise a backstop or wall to prevent the bottles, containers, and/or sanitary tissue products from moving to deeply with the receiving areas or spaces and/or the item receiving shelves.

Figure 2:
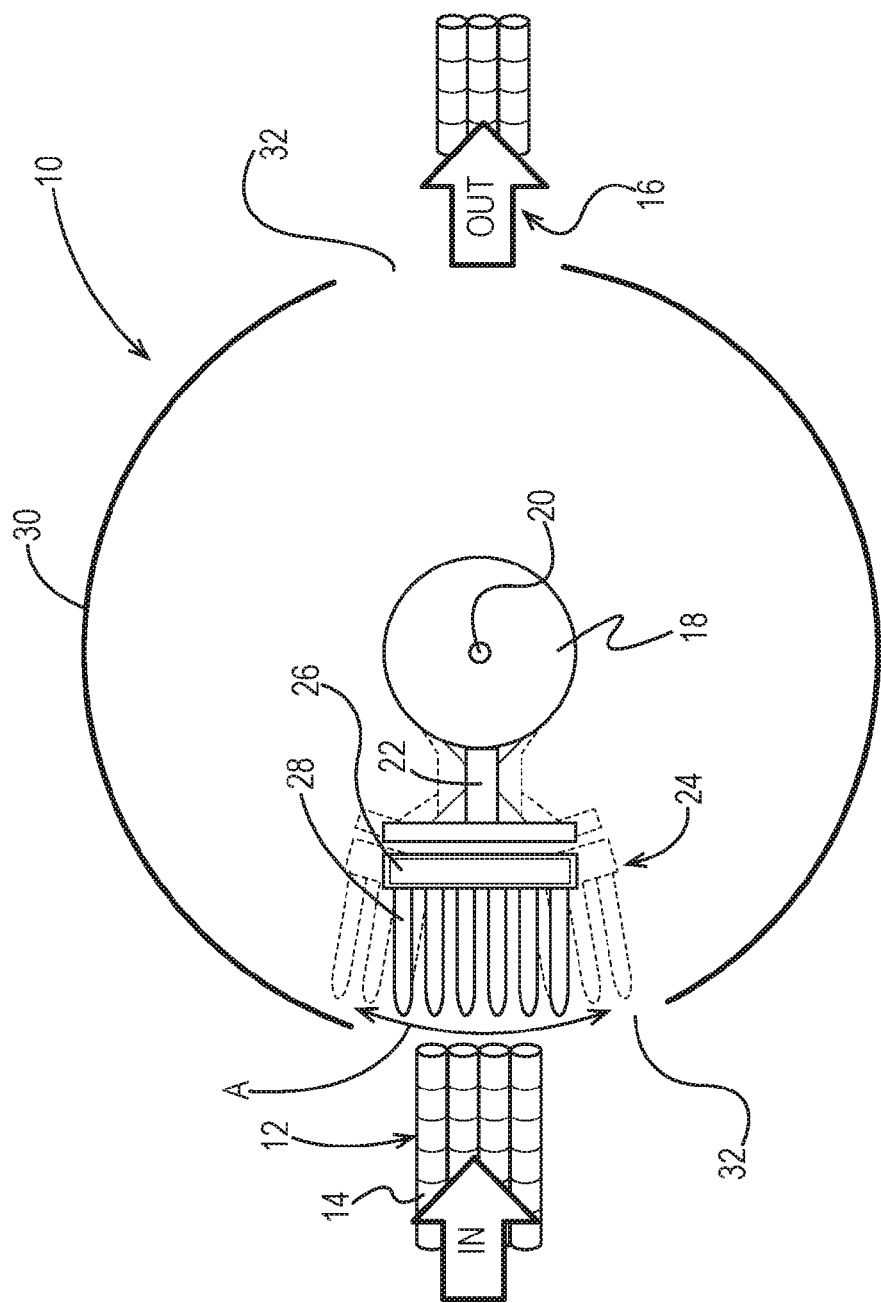
FIG. 2 is a top view illustration of a transfer mechanism in accordance with one non-limiting embodiment.
Figure 3:
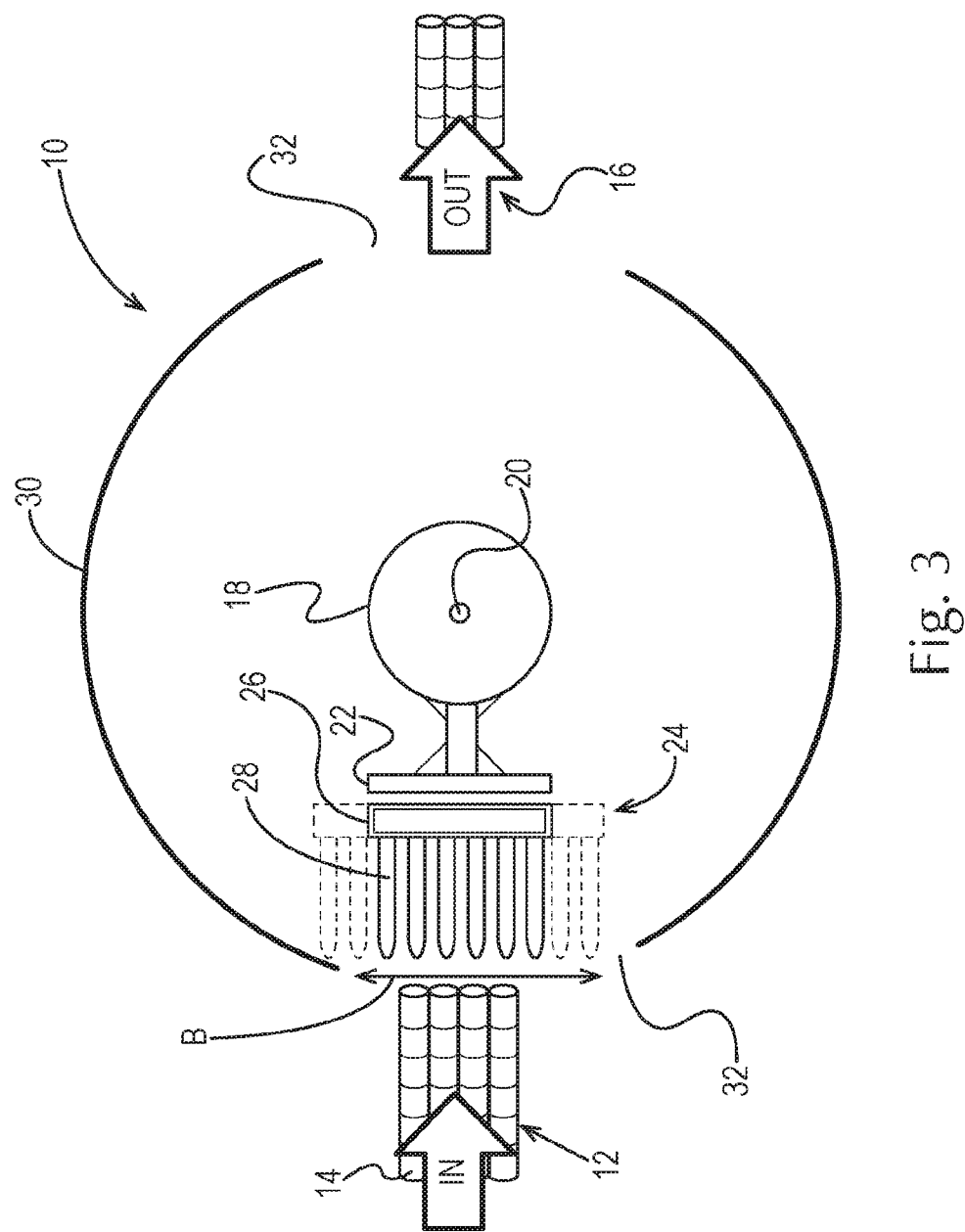
FIG. 3 is a top view illustration of another transfer mechanism in accordance with another non-limiting embodiment.

In one embodiment, referring to FIGS. 2 and 3, a guide 30 can be positioned around, or at least partially around, the transfer mechanism 10. In various embodiments, the guide 30 can be used for safety or containment so that the items 14 do not slide out of or off of the carrier mechanism 24 during movement, manipulation, or rotation of the carrier mechanism 24. The guide 30 can define openings 32 therein that align with one or more input streams 12 and one or more output streams 16. An opening 32 can be defined in the guide 30 for each input stream 12 coming into the transfer mechanism 10 and for each output stream 16 exiting the transfer mechanism 10. In one embodiment, the openings 32 can be blocked with covers (not illustrated) if only one input stream and one output stream is desired for a particular manufacturing process.

In one embodiment, referring to FIG. 2, the arm 22 can be fixedly attached to the turret 18 and the turret 18 can be rotatable about its longitudinal axis 20. In such an embodiment, the turret 18 can rotate in the clockwise and counter-clockwise direction, as indicated by arrow A and the dashed lines, when loading items onto the rods 28. Although the rods 28 are illustrated in various figures, those of skill in the art will understand that the item receiving areas, spaces, and shelves can be used in place of or in addition to the rods 28. The rotation or manipulation of the turret 18 can occur during loading even if the rods 28 are not provided on a carrier mechanism 24. In one example, if the rods are in a 6 wide×1 high pattern and the input streams 12 each have a single layer of items 14 entering the carrier mechanism 24, and there are four input streams 12, the turret 18, and thereby the arms 22 and the carrier mechanism 24, can rotate in the clockwise and counter-clockwise direction to fill all of the rods 28 with items 14. The turret 18 can also move vertically when receiving the items 14 to load additional rows of the items 14 onto the carrier mechanism 24. As another example, if the rods 28 are in a 6 wide×3 high pattern and the input streams 12 each have a single layer of items 14 moving towards the carrier mechanism 24 at a time, and there are four input streams 12, to obtain additional rows of the items 14 on the carrier mechanism 24, the turret 18, the carrier mechanism 24, and/or the arms 22 can move upward and/or downward in a vertical direction in addition to rotation about the longitudinal axis 20. Also, at least some of the rods 28 can move relative to each other before, during, or after the item loading process and/or an item unloading process. In one embodiment, the input streams 12 can move upwardly and/or downwardly to load additional rows of the items 14 onto the carrier mechanism 24 if the turret 18 is fixed vertically or if the turret 18 is movable vertically. In such an embodiment, the carrier mechanism 24, the arms 22, and/or the turret 18 can be fixed vertically or can remain vertically stationary.

In one embodiment, one or more robots (not illustrated) can be used in place of the turret 18. The robots can each have one or more of the arms 22 attached to them and the arms 22 can each be attached to a carrier mechanism 24. Alternatively, the robot can be directly attached to one or of the more carrier mechanisms 24. The robots can have the ability to position the arms 22 and/or the carrier mechanisms 24 relative to one or more input streams 12, pick up items 14 on the rods 28, and move the arms 22 and/or the carrier mechanisms 24 into alignment with one or more output streams 16 so that the items 14 can be discharged.

In other various embodiments, referring to FIG. 3, a portion of or all of the carrier mechanism 24 can move relative to the arm 22 and/or relative to the turret 18. In one embodiment, the base 26 can move relative to the arm 22. In such embodiments, the turret 18 can be rotatable or fixed. In one embodiment, the carrier mechanism 24 can move in a direction perpendicular to the longitudinal axis 20 of the turret 18. The carrier mechanism 24 can be movable in an essentially reciprocating fashion, in the directions indicated by arrow B, and as indicated by the dashed lines in FIG. 3. Although the carrier mechanism 24 can move relative to the turret 18 to accept items 14, the turret 18 can also rotate to provide additional maneuverability of the transfer mechanism 10. In one example, if the rods 28 are in a 6 wide×1 high pattern and the input streams 12 each have one single layer of items 14 moving toward the carrier mechanism 24, and there are four input streams 12, the carrier mechanism 24 can move in the directions indicated by arrow B, and as indicated by the dashed lines in FIG. 3, such that all of the rods 28 can be filled. In various embodiments, if the rods 28 are in a 6 wide×2 high pattern, after filling a first row of items, the turret 18 and/or the carrier mechanism 24 can move vertically such that additional rows of items 14 can be loaded onto the rods 28. In other various embodiments, the carrier mechanism 24 can move relative to the arm 22 and/or the turret 18 to adjust the vertical height of the rods 28. In still other various embodiments, the rods 28 can move relative to the base 26 and/or relative to each other during the item loading process.

In one embodiment, referring to FIGS. 1-4B, for example, one or a plurality of the rods 28 can extend outwardly from the base 26 in a direction away from the longitudinal axis 20 of the turret 18. In various embodiments, at least one of the rods 28 can be movable relative to at least one other rod 28 to adjust the spacing between the rods 28 and/or to compress, or slightly compress, items 14, such as rolls of sanitary tissue products, for example, between the rods 28 during manipulation of the carrier mechanism 24. In one embodiment, all of the rods 28 can be movable relative to at least one other rod 28. The rods 28 can be moveable manually or through the use of actuators. The rods 28 can be formed of a rigid material, such as a metal, for example, and, in one embodiment, can be coated or covered with a resilient material, such as a rubber, for example. The resilient material can help the rods 28 in gripping items 14 and/or can protect the items 14 from crushing during gripping. In another embodiment, the rods 28 can be at least partially formed of or coated with a low coefficient of friction material to aid the rods 28 in engaging void areas within the cores of sanitary tissue products, for example. In one embodiment, the rods 28 can be positioned around, or at least partially around, a circumference or perimeter of the turret 18.

In various embodiments, referring to FIGS. 4A and 4B, an example carrier mechanism 24 can comprise a base 26 and a plurality of rods 28 extending from the base 26. Although four rods 28 are illustrated as an example, any suitable number of rods 28 can extend from the base 26. Some example configurations of the rods 28 are a carrier mechanism 24 having a 4 rod wide×2 rod high configuration, a 4 rod wide×4 rod high configuration, a 4 rod wide×6 rod high configuration, a 6 rod wide×2 rod high configuration, a 6 rod wide by 3 rod high configuration, or a 6 rod wide by six rod high configuration. In one embodiment, the base 26 can comprise one or more plates 34 with slots 36 defined therein. A portion of the rods 28 can extend through the slots 36. In various embodiments, the base 26 can comprise a first set of plates 34 and a second set of plates 34'. The two plates of the first set of plates 34 can move toward and away from each other in unison using a scissor-like linkage operably engaged with an actuator, for example. Similarly, the two plates of the second set of plates 34' can move toward and away from each other in unison using a scissor-like linkage operably engaged with an actuator, for example. The movement of the sets of the plates 34 and 34' can allow the rods 28 to be moved toward and away from each other in more than one direction. FIG. 4A illustrates the rods 28 in a first position, while FIG. 4B illustrates the rods 28 moved into a second position. In one embodiment, at least one rod 28 or all of the rods 28 can have a pointed end portion, an arcuate end portion, and/or a conical portion 38. Such a feature can aid the rods 28 in engaging void areas within the items 14, such as void areas within the cores of rolled sanitary tissue products, for example, by essentially being self-centering during engagement. Each rod 28 can comprise a backstop that prevents items 14 from being positioned to deeply on the rods 28. Further, each rod 28 can be any suitable length depending on how many of the items 14 will be loaded thereon. In such an embodiment, the backstop may be adjustable about the rods 28 depending on how many items 14 will be loaded onto the rods 28. In various embodiments, one or more of the rods 28 and/or one or more of the carrier mechanism 24 can be configured to tilt for additional flexibility. In one embodiment, this tilting capability can be used to load additional rows of items 14, for example.

Most conventional sanitary tissue product handling mechanisms do not manipulate the sanitary tissue products by void areas within the cores, but instead use outer surfaces or portions of the sanitary tissue products. By handling the sanitary tissue products, by void areas within the cores (and engaging inner surfaces of the cores with the rods 28), instead of by outer surfaces or portions thereof, the outer surfaces or portions of the sanitary tissue products can be maintained in an undamaged state, which is desirable when the sanitary tissue products are on a shelf in a store.

One example of an item loading sequence is discussed below with reference to FIG. 5A. In this example, four input streams 12, each three items 14 deep, are fed into the carrier mechanism 24. This is an example of one group of items 14 being fed into the carrier mechanism 24. In practice, multiple groups of items 14 will be sequentially fed into the carrier mechanism 24 on a continuous or a non-continuous basis. The carrier mechanism 24, in this instance, comprises six rods 28 wide, by three rods 28 high (rods 28 are only illustrated in the first portion of the figure). The carrier mechanism 24 could also comprise six receiving spaces or shelves wide by three receiving spaces or shelves high. The rods 28, receiving spaces, or receiving shelves are represented in FIGS. 5A-6B by squares. The rods 28 can extend from the center of the squares, for example. The length of any of the rods 28 discussed herein can be suitable for accepting the desired number of the items 14, such as rolled sanitary tissue products. First, a first item 14 from each of the four input streams 12 is loaded onto the four bottom and left-most rods 28. This leaves four input streams 12 that are two items 14 deep. Next, the carrier mechanism 24 is shifted to the right relative to the position of the fixed input streams 12. In other embodiments, the input streams 12 could be moved to the right with the carrier mechanism 24 being fixed. In still other embodiments, the plurality of rods 28 could be shifted to the right with the input streams 12 and the base 26 being fixed. The two right-most input streams 12 of the items 14 are then loaded onto the two remaining empty rods 28 in the bottom-most row of the rods 28. This leaves four input streams 12, with two input streams 12 being one item 14 deep and the other two input streams 12 being two items deep. Then, the carrier mechanism 24 is shifted downwardly with respect to the input streams 12 so that the four input streams 12 can feed four items 14 onto the right-most four rods 28 in the second row of rods 28. This leaves two input streams 12, each stream being one item 14 deep. Next, the carrier mechanism 24 is shifted to the left. The items 14 in the two remaining input streams 12 are then loaded onto the remaining two left-most empty rods 28 in the second row of rods 28. Thereby, the carrier mechanism 24 is loaded with a two high, by six wide, by one item deep set of items 14. Of course, this process can be repeated to load a grouping of items 14 that is two or more items deep.

In one embodiment, referring to FIG. 5B, once the carrier mechanism 24 has been manipulated or rotated from a position aligned, or substantially aligned, with the one or more input streams 12 into a position aligned, or substantially aligned, with the one or more output streams 16, the items 14 can be unloaded from the carrier mechanism 24. In one embodiment, a pusher apparatus (see e.g., FIGS. 14A-14C, 16A, and 16B and their description below), and/or other mechanisms, can be used to unload the items 14. The items 14 can be unloaded onto the one or more output streams 16 in two high by three wide item groupings. In various embodiments, the first grouping of items 14 can be unloaded onto a first output stream and a second grouping of items 14 can be unloaded onto a second output stream. In other embodiments, the first grouping of items 14 can be unloaded onto the same output stream as the second grouping of items 14 either at the same time or at different time intervals. It is important to note that all of the rods 28 or receiving spaces or shelves on each carrier mechanism do not always need to be used. Some can be left empty.

The carrier mechanism 24 can also be useful for layering items 14, such as sanitary tissue products, for example. The carrier mechanism 24 can receive four input streams 12 of items 14, then move vertically to accept four additional input streams 12 of items 14, and then move into a positioned aligned with, or substantially aligned with, one or more output streams 16. The carrier mechanism 24 can then output items 14 two or more layers high using a pusher apparatus or other device.

Figure 6A:
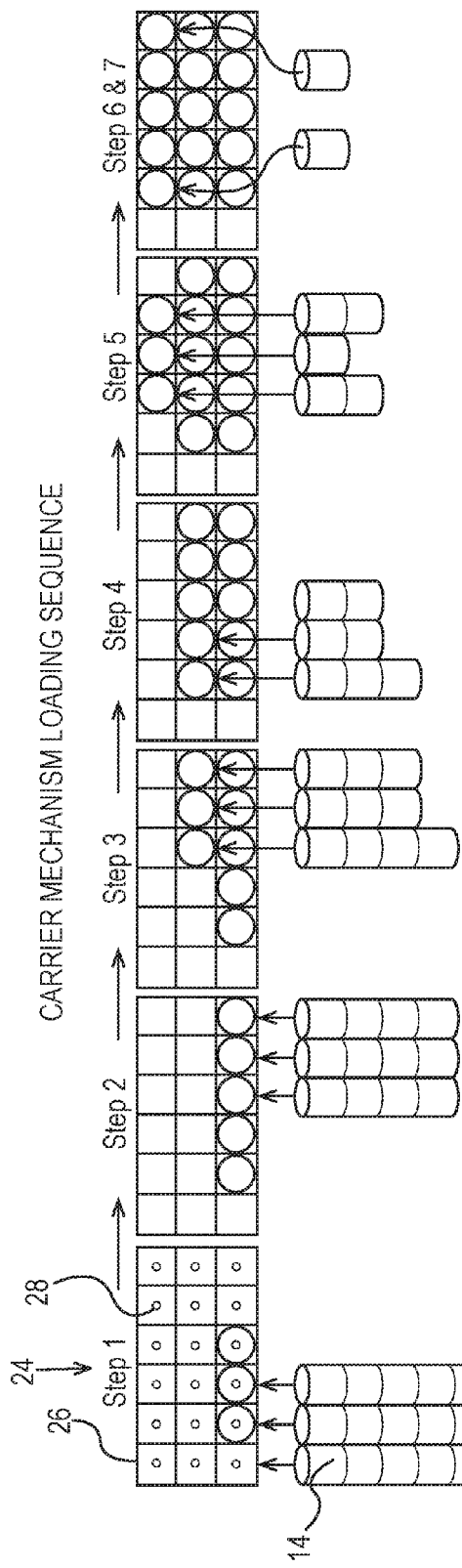
FIG. 6A is an example of another loading sequence of a carrier mechanism in accordance with one non-limiting embodiment.

Another example of an item loading processes is discussed below with reference to FIGS. 6A-6B. In this example, three input streams 12, each five items 14 deep, are fed into the carrier mechanism 24. The carrier mechanism 24, in this instance, comprises six rods 28 wide by three rods 28 high (rods 28 are only shown in the first portion of the figure). The carrier mechanism 24 could also comprise six receiving spaces or shelves wide by three receiving spaces or shelves high. First, a first item 14 from each of the three input streams 12 is loaded onto three rods 28 in the bottom row of rods 28. This leaves three input streams 12 that are four items 14 deep. Next, the carrier mechanism 24 is shifted to the right relative to the fixed position of the input streams 12. The input streams 12 could also be moved to the right with the carrier mechanism 24 being fixed, as discussed above. The two right-most input streams 12 of items 14 are then loaded onto the two right-most empty rods 28 in the bottom-most row of rods 28. This leaves three input streams 12, with two input streams 12 being three items 14 deep and the other input stream 12 being four items deep. Then, the carrier mechanism 24 is shifted downwardly with respect to the input streams 12 so that the three input streams 12 can feed three items 14 onto the right-most three rods 28 in the second row of rods 28. This leaves three input streams 12, two input streams 12 being two items 14 deep and the other input stream 12 being three items 14 deep. Next, the carrier mechanism 24 is shifted to the left and two items 14 are fed onto two rods 28 in the second row. This leaves three input streams 12, the end two input streams 12 being two items 14 deep and the middle input stream 12 being one item 14 deep. The carrier mechanism 24 is then shifted downwardly and three items 14 are fed onto three rods 28 in the top row of rods 28. This leaves a first input stream 12 that is a single item deep and a second input stream 12 that is a single item deep (the items 14 in the middle input stream 12 are now all loaded). The carrier mechanism 24 is then shifted to the left so that the single item 14 in the left input stream 12 is fed onto a rod 28 in the top row of rods 28. This leaves the right-most input stream 12 with one item 14 deep. The carrier mechanism 24 is then shifted to the right so that the remaining item 14 can be positioned on the right-most rod 28 in the top row of rods 28. Thereby, the carrier mechanism 24 is loaded a single item 14 deep, three items 14 high, and five items 14 wide. Of course, this process can be repeated to load a grouping of items 14 more than one item deep. Instead of the carrier mechanism 24 moving during loading, the input streams 12 can move relative to the carrier mechanism 24.

Figure 6B:
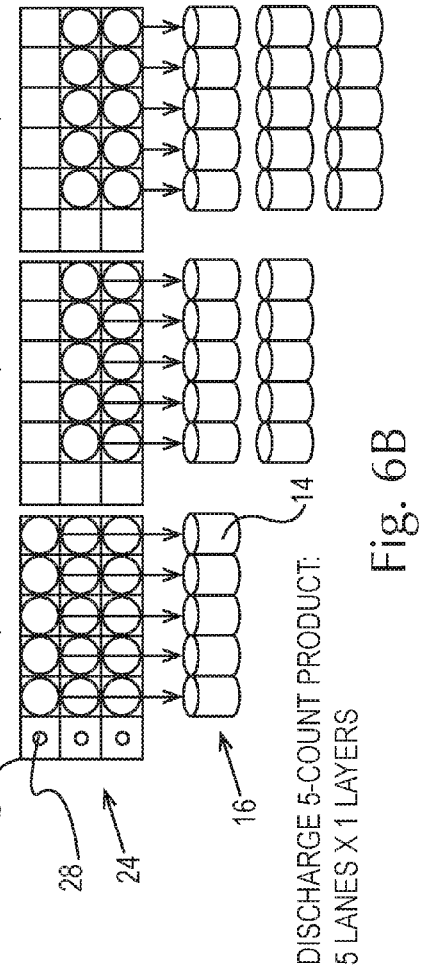
FIG. 6B is an example unloading sequence of the carrier mechanism of FIG. 6A in accordance with one non-limiting embodiment.

In one embodiment, referring to FIG. 6B, when the carrier mechanism 24 has been manipulated or rotated from a position aligned, or substantially aligned, with the input streams 12 into a position aligned, or substantially aligned, with one or more output streams 16, the carrier mechanism 24 can be unloaded. In one embodiment, a pusher apparatus (see e.g., FIGS. 14A-14C, 16A, and 16B and their description below) and/or other mechanisms, can be used to unload the items 14. The items 14 can be unloaded onto an output stream 16 by rows of rods 28 to output a grouping of items 14 that is one row deep, one row high, and five rows wide. Therefore, in this example, three groupings of items 14 can be unloaded. In various embodiments, the first grouping of items 14 can be unloaded onto a first output stream 16, a second grouping of items 14 can be loaded onto a second output stream 16, and a third grouping of items 14 can be unloaded onto a third output stream 16. In other embodiments, the first grouping of items 14, the second grouping of items 14, and the third grouping of items 14 can all be unloaded or discharged onto the same output stream 16 at different time intervals and/or sequentially.

In various embodiments, each of the rods 28 can move toward and away from at least one other rod 28 to slightly compress the items 14 on the rods 28 at least during manipulation or rotation of the transfer mechanism 28. This can maintain the items 14 on the rods 28 despite forces of acceleration created during rotation or manipulation of the transfer mechanism 10. Stated another way, the compression of the items 14 by the rods 28 can inhibit the items 14 from sliding off of the rods 28 during rotation of the arms 22 or turret 18. The rods 28 can move toward one another after the loading process and can then move away from each other when the carrier mechanism 24 is aligned with, or substantially aligned with, an output stream 16. In various embodiments, movements of the rods 28 can be individually controlled to provide the ability to slightly compress certain items 14 without compressing others or to adjust for the dimensions (e.g., diameters) of the items 14 to be loaded.

The above are merely examples of loading and unloaded items 14 from carrier mechanisms 24. Of course, a multitude of configurations and processes are possible and are within the scope of the present disclosure. In one embodiment, an input stream 12 can have a different number of items 14 than an output stream 16. For example, in FIGS. 5A and 5B, each input stream 12 has one item 14 being loaded at a time, while each output stream 16 has six items 14 being unloaded at a time. In FIGS. 6A and 6B, each input stream 12 has one item being loaded at a time, while each output stream 16 has five items being unloaded at a time. In various embodiments, the items 14 in an input stream 12 can have a different configuration as the items 14 in the output stream 16. Although each input stream 12 is illustrated as a single layer of items 14, each input stream 12 could comprise multiple layers of items 14 that are loaded simultaneously or independently, for example.

Figure 7:
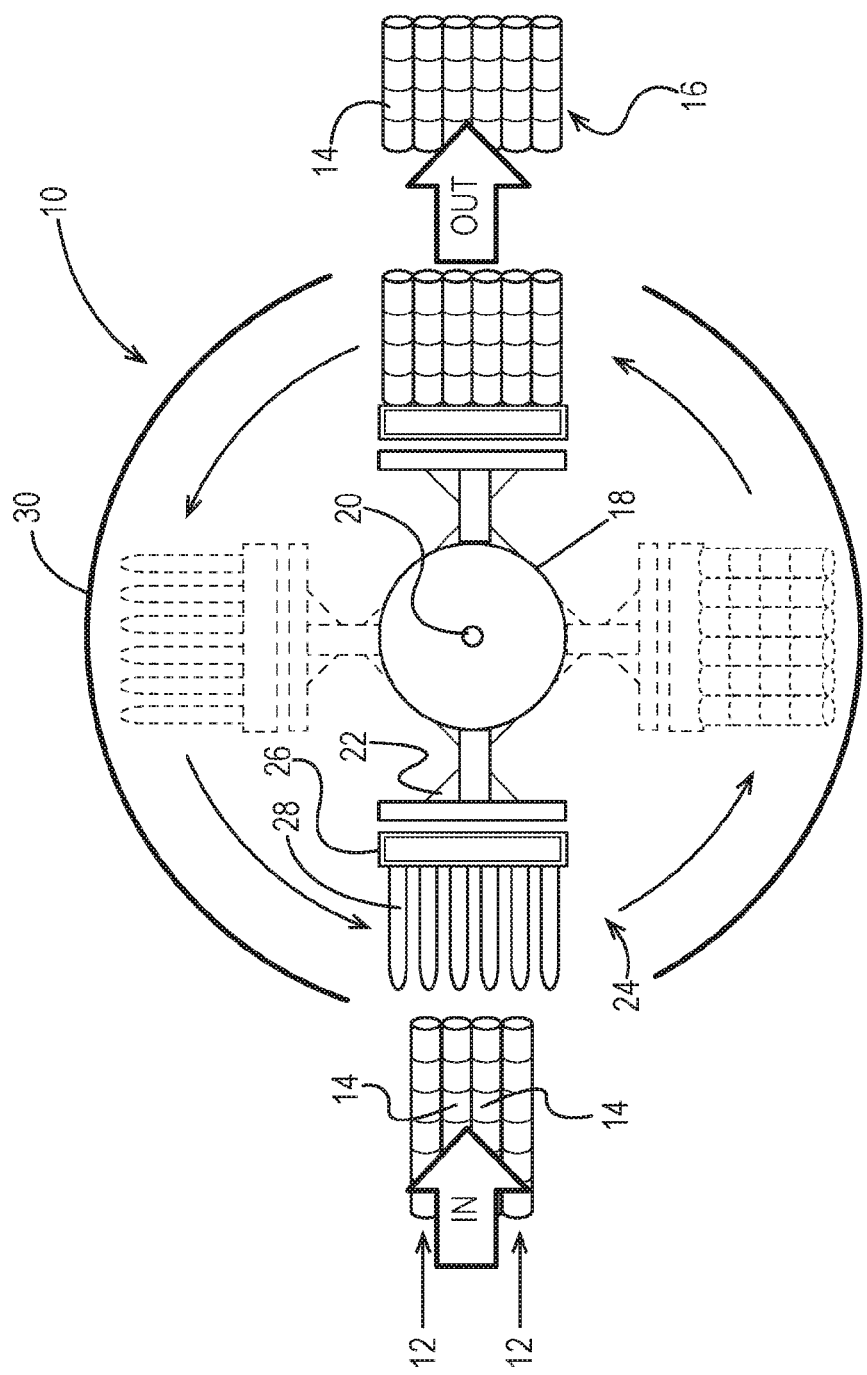
FIGS. 7-11 are top view illustrations of transfer mechanisms in accordance with various non-limiting embodiments.
Figure 8:
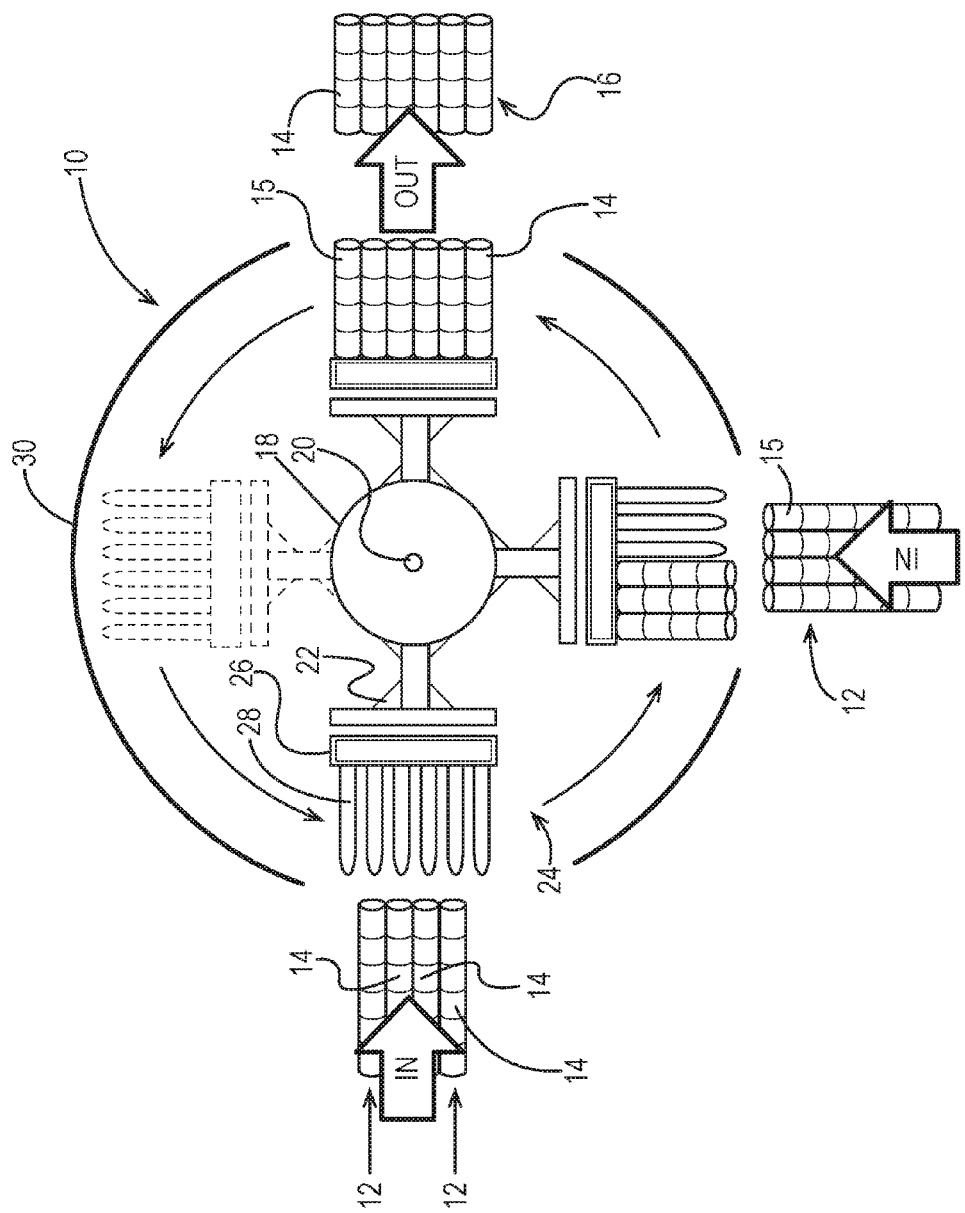

Various example configurations of transfer mechanisms will now be discussed in reference to the figures. In one embodiment, referring to FIG. 7, a transfer mechanism 10 can comprise two arms 22 that can each rotate about a turret 18 or that are rotated by the turret 18. The input stream 12 and the output stream 16 are positioned about 180 degrees apart from each other. The transfer mechanism 10 can receive four input streams 12 of one item 14 at a time and can output a grouping of items 14 6 items wide at a time. In various embodiments, the transfer mechanism 10 illustrated in FIG. 8 comprises three arms 22 rotating about a turret 18 or that are rotated by the turret 18. The transfer mechanism 10 has two separate locations of input streams 12 feeding therein and one location of an output stream 16. The two separate locations of input streams 12 in FIG. 8 are positioned about 90 degrees apart, for example, although the input streams 12 can be positioned at any other suitable angle with respect to each other. By providing two locations of input streams 12, two different items 14 and 15 can be loaded onto the carrier mechanism 24 and discharged together at the output stream 16. In FIG. 8, the two different items 14 and 15 are indicated by shading. The two arms 22 and carrier mechanisms 24 aligned with the two separate locations of input streams 12, as shown in FIG. 8, can be loaded, or partially loaded, simultaneously or independently, at different time intervals. In other embodiments, only one position of input streams 12 may be used for loading with the other position of input streams 12 provided merely as a backup, for example. In still other various embodiments, each carrier mechanism 24 can be partially loaded by one location of input streams 12 prior to being rotated into a position aligned with, or substantially aligned with, one or more output streams 16.

Figure 9:
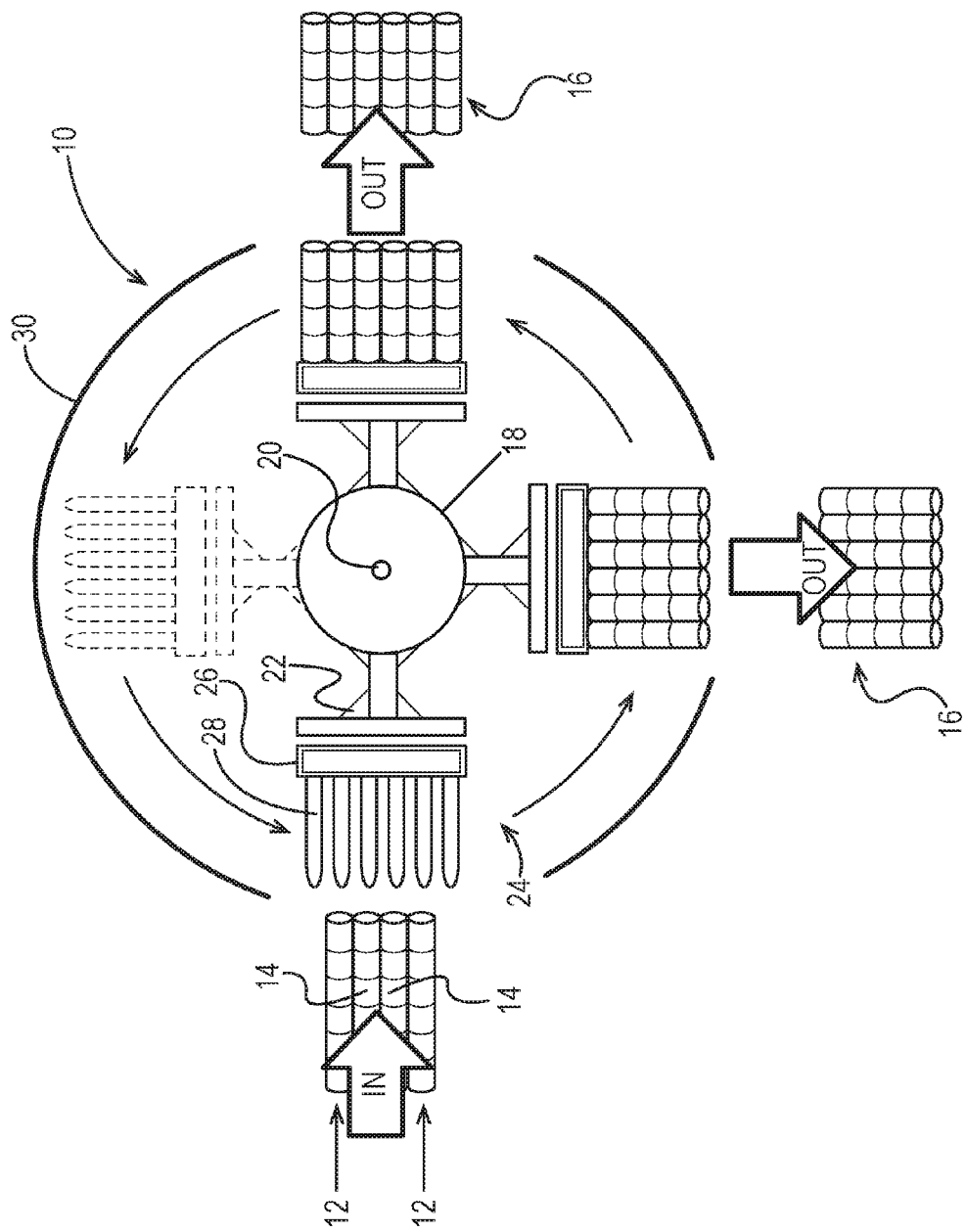

In one embodiment, referring to FIG. 9, the transfer mechanism 10 can be fed by multiple input streams 12 at a first location and can discharge two output streams 16 at different locations. In various embodiments, the first and second output streams 16 can be used to output items 14 simultaneously or independently, at different time intervals. In one embodiment, if the items 14 are sanitary tissue products, a first output stream 16 can be used to send the sanitary tissue products to a palletizer and a second output stream 16 can be used to send the sanitary tissue products to a bundler, for example. The sanitary tissue products can be conveyed to the palletizer and/or the bundler using a conveyor, for example. In various embodiments, one of the output streams 16 can also be used as an input stream 12 or as an output stream 16 and an input stream 12 depending on the desired manufacturing process. The locations of the input streams 12 and the locations of the output streams 16 can be positioned at any suitable angle away from each other. In one embodiment, the turret 18 (if the turret is rotating) may be configured to rotate in the clockwise and counter-clockwise directions. In another embodiment, the arms 22 (if the arms 22 are rotating about a non-rotatable turret 18) can be configured to rotate in the clockwise and the counter-clockwise directions. In the example embodiment of FIG. 9, at least one other input stream or output stream could be added to provide the transfer mechanism 10 with greater flexibility in its capabilities. In one embodiment, the carrier mechanism 24 can be partially unloaded at a first output stream 16 and partially unloaded at a second output stream 16.

Figure 10:
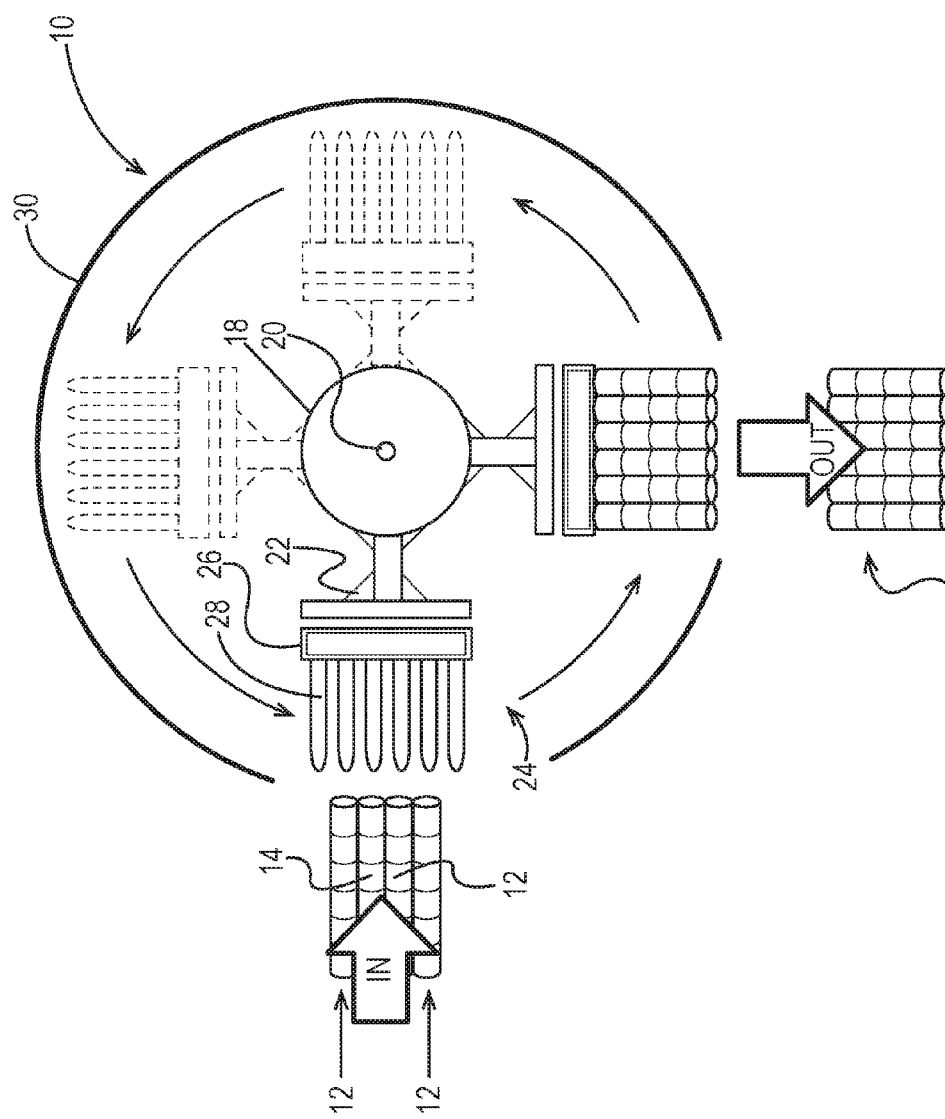

In one embodiment, referring to FIG. 10, the transfer mechanism may only have one location of input streams 12 and one location of an output stream 16. The input streams 12 may be positioned about 100 or less degrees away from the output stream 16, for example.

Figure 11:
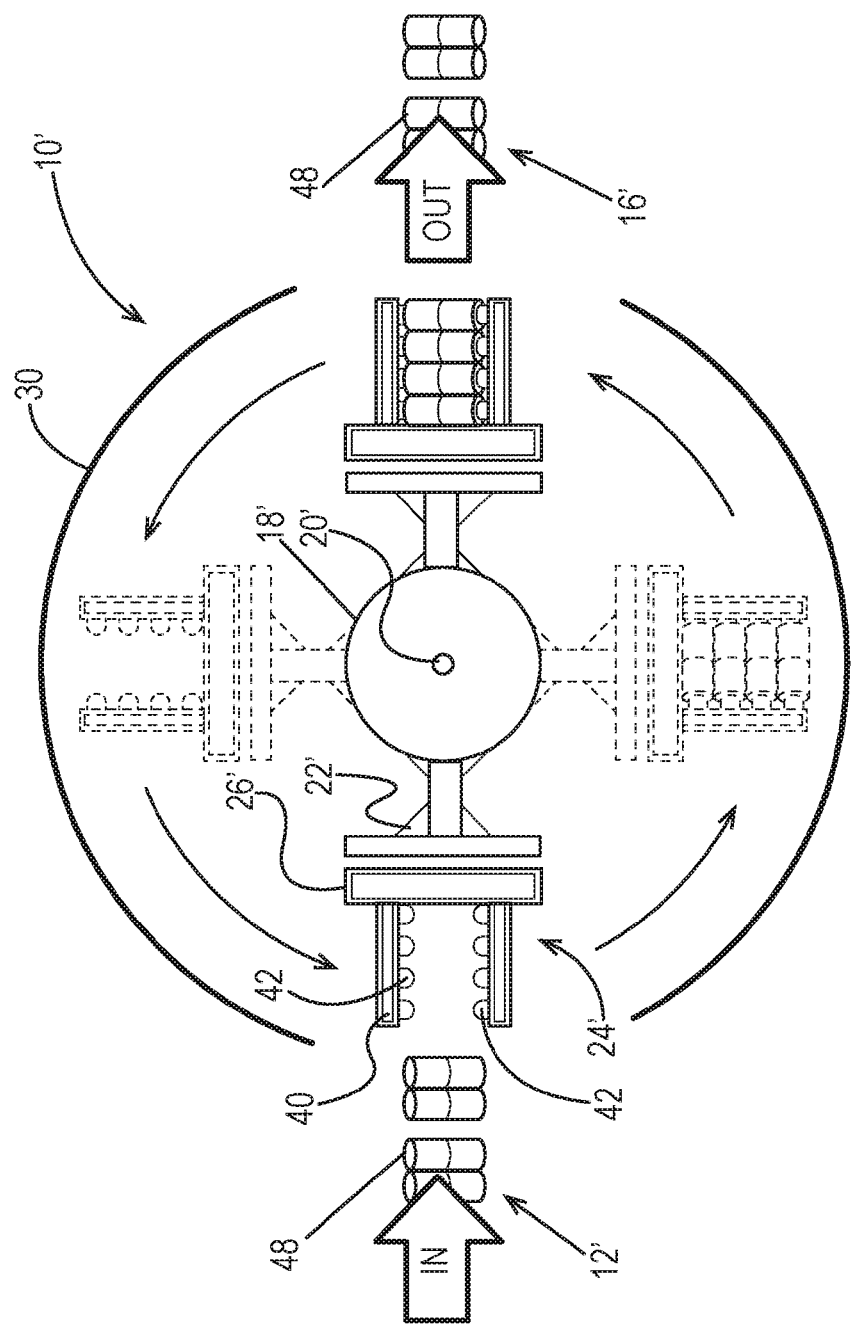
Figure 12:
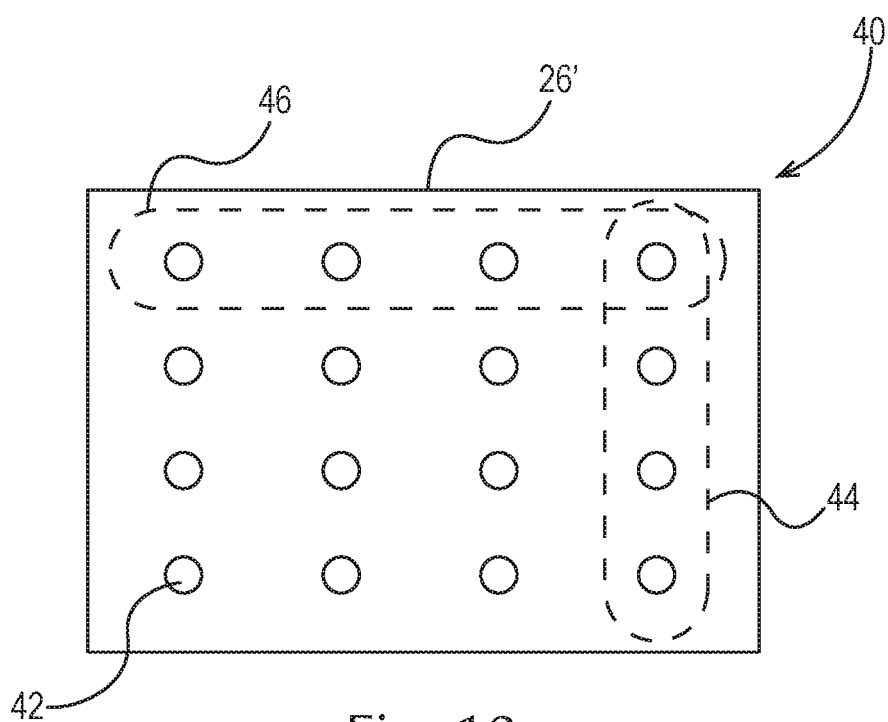
FIG. 12 is a front view of an example support comprising a plurality of nubs thereon in accordance with one non-limiting embodiment.

In one embodiment, referring to FIGS. 11 and 12, a transfer mechanism 10' can comprise a turret 18', similar to or the same as the turret 18 described above, one or more arms 22', similar to or the same as the arms 22 described above, a carrier mechanism 24' comprising a base 26' and two or more supports 40. The carrier mechanism 24' can be engaged with or formed with the arms 22' similar to that described above with respect to the carrier mechanism 24 and the arms 22. The base 26' of the carrier mechanism 24' can be engaged with or formed with two or more of the supports 40. The supports 40 can extend outwardly from the base 26' in a direction away from the turret 18' and away from the longitudinal axis 20' of the turret 18'. Example supports 40 are illustrated in FIGS. 11 and 12. FIG. 12 is a front view of a single support 40. The two or more supports 40 can optionally comprise one or more nubs 42 positioned about a surface of each of the supports 40. The nubs 42 can be arranged in one or more columns 44 and one or more rows 46 on each of the supports 42. At least one nub 42 on a support 40 can be moveable with respect to another nub 42 on the support 40. Alternatively, all or most of the nubs 42 can be moveable relative to at least one other nub 42. This adjustability feature can allow the nubs 42 to be moved relative to one another to accommodate items, such as sanitary tissue products, for example, having different diameters, void areas with the cores, and/or other dimensions. The nubs 42 can be comprised of or covered with a resilient material, such as a rubber, for example, to aid the nubs 42 in engaging and gripping items 14 or packaged items 14, and to at least inhibit the nubs 42 from crushing portions of the items 14 or packaged items 14. In another embodiment, the nubs 42 can be at least partially formed of or coated with a low coefficient of friction material configured to allow the nubs 42 to easily engage the items 14 or packaged items 14. The supports 40 can be arranged on the base 26' such that the nubs 42 on a first support 40 can face the nubs 42 on a second support 40, as illustrated in FIG. 11. The supports 40 and the nubs 42 can be used to engage sanitary tissue products 48 or packages of sanitary tissue products 48 therebetween. In one embodiment, the supports 40 can move relative to each other and/or relative to the base 26' using an actuator. In various embodiments, the supports 40 can be used to engage a plurality of sanitary tissue products 48 or a plurality of packages of sanitary tissue products 48 at the same time. In one embodiment, the nubs 42 can engage film wrapped packages of sanitary tissue products 48 in locations where the film does not contact the sanitary tissue products 48 within the film (i.e., non-product contacting areas). These non-product contacting areas can be aligned with, or substantially aligned with, void areas inside the cores of one or more sanitary tissue products 48 or can be present in between sanitary tissue products 48. Owing to the circular shape of sanitary tissue products 48, gaps can be provided intermediate a plurality of sanitary tissue products 48. Such engagement of the non-product contacting areas of a package of sanitary tissue product 48 can prevent, or at least inhibit, compression of the cores in a direction substantially perpendicular to a longitudinal axis of the cores. If cores of sanitary tissue products 48 are compressed, they can have an ovate shape, which is generally undesirable for dispensing from a circular tube or bar. One or more of the nubs 42 can comprise ends having pointed portions, arcuate portions, and/or conical portions to aid the nubs' engagement with the non-product containing areas of the packages. Once the sanitary tissue products 48 and/or packages of sanitary tissue products 48 are engaged with the nubs 42, the transfer mechanism 10' can manipulate or rotate from a positioned aligned with, or substantially aligned with, one or more input streams 12' to a position aligned with, or substantially aligned with, one or more output streams 16'. The support 40 can also pivot with respect to the base 26' and/or the arm 22' to enable manipulation of the sanitary tissue products 48 or packages of the same from a vertical position into a horizontal position or other suitable position. In one embodiment, the base 26' can comprise a pusher apparatus comprising, for example, a linear actuator configured to aid in discharging packages of sanitary tissue products 48 from the carrier mechanism 24. This pusher apparatus can be located intermediate the first support 40 and the second support 40.

In one embodiment, a transfer mechanism can be used in a method of transferring packaged items. The method can comprise feeding packaged items, such as packaged sanitary tissue products 48, for example, toward the carrier mechanism from one or more input streams, engaging the packaged items with the two or more supports extending from the carrier mechanism, manipulating the carrier mechanism relative to the one or more input streams into a position substantially aligned with one or more output streams, and feeding the packaged items onto the one or more output streams. The configuration of the packaged items in the one or more input streams can be different than the configuration of packaged items in the one or more output streams. The method can further comprise accelerating the carrier mechanism between at least one of the input streams and at least one of the output streams and retaining the packaged items in contact with the supports and/or the nubs during the accelerating step. The nubs 42 can contact the non-product containing areas on the packages.

Figure 13:
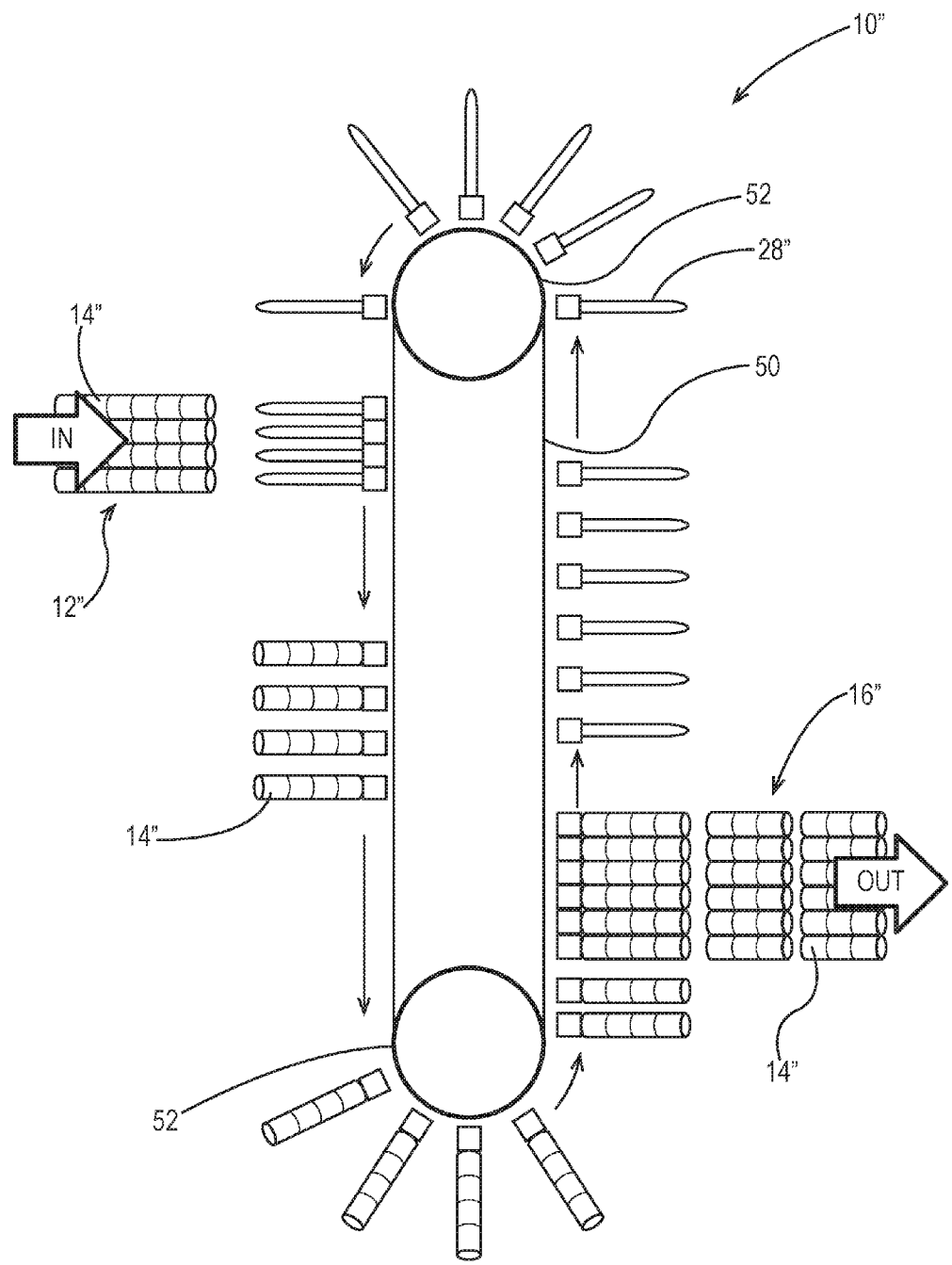
FIG. 13 is a top view illustration of another transfer mechanism in accordance with one non-limiting embodiment.

In one embodiment, referring to FIG. 13, an example transfer mechanism 10" is illustrated. The transfer mechanism 10" can comprise a conveyor 50 rotating about at least two rolls or rollers 52. The conveyor 50 can be a belt, a chain, or other mechanical mechanism. A plurality of rods 28" can extend from the conveyor 50 and rotate with the conveyor 50. In one embodiment, the rods 28" can be accelerated about portions of the conveyor 50 (i.e., move at a speed faster than the conveyor 50) or "dwelled" about the conveyor 50 (i.e., move at a speed slower than the conveyor 50). In other embodiments, the rods 28" can be coupled to the conveyor 50 when movement of the rods 28" is desired and decoupled from the conveyor 50 when movement of the rods 28" is not desired. Such features can help in joining the rods 28" into groups, while loading and/or unloading items 14", for example, or separating the rods 28" from each other at appropriate times. Although FIG. 13 illustrates a top view, the rods 28" can be provided in single rod deep columns or can be provided in multiple rod deep columns. In one embodiment, at the loading and unloading areas, positive stops can be provided to ensure suitable alignment of the rods 28" with the loading and/or unloading areas.

In operation, the conveyor 50 can rotate about the rolls or rollers 52, thereby rotating the rods 28" about the rolls 52. The rods 28" can have any suitable length. The length can be appropriate for accepting one item 14" or multiple items 14". As an example, four input streams 12" of items 14" can be feed onto the rods 28". If more than one rod deep columns of rods 28" are provided, the rods 28" can move upwardly and downwardly relative to the conveyor 50 to load more than one row of items 14". In other various embodiments, the rods 28" can remain stationary on the conveyor 50 and the input streams 12" can move upwardly and downwardly relative to the conveyor to load multiple rows of rods 28" with items 14". Once loaded with the items 14", the rods 28" can then be rotated about the conveyor 50 to a point where the items 14" can be outputted to one or more output streams 16". The items 14" in the input streams 12" can have a different configuration than the items 14" in the output streams 16". For example, each input stream 12" can have a single layer of one item 14, while each output stream 16" can have multiple items 14 in multiple rows and columns.

In one embodiment, referring to FIGS. 14A-14C, an example pusher apparatus is disclosed. The pusher apparatus can be used to push or force items, such as sanitary tissue products 48, for example, off of the rods 28 onto one or more output streams 16. The pusher apparatus can comprise a plurality of fingers 54 extending between at least some of the rods 28. In one embodiment, a finger 54 can be positioned on each side of one or more rods 28. In other embodiments, only one finger 54 may be positioned adjacent to a rod 28. The fingers 54 can be operably engaged with one or more linear actuators 56. In one embodiment, two or more fingers 54 can be engaged with one linear actuator 56, for example. Referring to FIG. 14B, the linear actuator 56 can be configured to move the fingers 54 relative to the base 26, as shown by arrow E, to disengage the sanitary tissue products 48 from the rods 28. In one embodiment, referring to FIG. 14C, the base 26 can move relative to the fingers 54 such that less than all of the sanitary tissue products 48 on the rods 28 may be discharged at one point in time. In other various embodiments, the fingers 54 can be height adjustable relative to the base 26 such that less than all of the sanitary tissue products 48 on the rods 28 will be discharged at one point in time. In various embodiments, one or more linear actuators 56 can be activated independently from one or more other linear actuators 56. This feature, along with the height adjustment of the fingers 54 and/or the base 26, can allow for discharge of a plurality of configurations of output streams 16.

In one embodiment, referring to FIGS. 15A and 15B, one or more of the rods 28 can expand from a first position (FIG. 15A) into a second position (FIG. 15B) once rolls of sanitary tissue product 48 are positioned on the rods 28. This expansion can function to hold the rolls of the sanitary tissue product 48 on the rods 28 during rotation of the turret 18, the arms 22, and/or the carrier mechanism 24, for example. After the rolls of the sanitary tissue products 48 are discharged from the rods 28, the rods 28 can retract into the position shown in FIG. 15A. This expansion can be caused by an actuator within the rods 28.

In one embodiment, referring to FIGS. 16A and 16B, the rods 28 can define one or more elongate slots 58. A collar 60 can be movable along the elongate slots 58 from a first position where the collar 60 is located proximate to the base 26 (FIG. 16A) into a second position where the collar 60 is located distal from the base 26 (FIG. 16B). The collar 60 and the elongate slots 58 can together be referred to as a pusher apparatus. The collar 60 can be moved along the elongate slots 58 through the use of an actuator, such as a linear actuator, for example. The collar 60 can be used to discharge rolls of sanitary tissue products 48 from the rods 28 at the appropriate time. If each rod 28 has a collar 60, each collar 60 can be independently activated to enable various configurations of sanitary tissue products 48 to be discharged at one point in time. In other embodiments, the collar 60 can be fixedly positioned on one or more rods 28 and can have a plurality of openings in an item-facing surface thereof. Air can be forced through the openings at the appropriate time to discharge the sanitary tissue products 48 from the rods 28. In other various embodiments, belts or conveyors can be incorporated into one or more of the rods 28. The belts or conveyors can engage the cores of the sanitary tissue products 48 on the rods 28 and move them in a direction away from the base 26 to disengage the sanitary tissue products 48 from the rods 28. In still other various embodiments, the rods 28 can have a series of openings therein. Air can be forced through the openings to discharge the sanitary tissue products 48 from the rods 28.

In various embodiments, the rods 28 can have one or more sensors thereon, therein, and/or associated therewith. The sensors can be used to detect the presence of sanitary tissue products 48 thereon. For instance, a collar 60 of a rod 28 may not need to be actuated if a sensor detects that sanitary tissue products 48 are not present on the rod 28. In other various embodiments, the sensors can be configured to detect the number and size of the sanitary tissue products 48 on the rods 28, for example.

In one embodiment, the various transfer mechanisms of the present disclosure, or other transfer mechanisms, can be used in methods for transferring items, such as methods for transferring sanitary tissue products, for example. One example method can comprise feeding items onto or toward a carrier mechanism from one or more input streams, wherein the carrier mechanism comprises a plurality of rods extending therefrom. The method further comprises engaging void areas (e.g., areas inside cores of sanitary tissue products) defined in the items with at least some of the plurality of rods, manipulating the carrier mechanism relative to the one or more input streams into a position substantially aligned with, or aligned with, one or more output streams, and feeding the items onto the one or more output streams. The configuration of items in each input stream can be different than the configuration of items in each output stream. The method can further comprise moving the carrier mechanism relative to the one or more input streams after the engaging step (above) and engaging void areas defined in a second group of items in the one or more input streams with at least some of the rods. One or more carrier mechanisms can simultaneously receive two separate input streams of items from different locations and/or can independently, at different time intervals, receive two separate input streams of items. Similarly, one or more carrier mechanisms can simultaneously feed two separate output streams of items or independently, at different time intervals, feed two separate output streams of items. One or more carrier mechanisms can also feed a first group of items to a first output stream and feed a second group of items to a second output stream, either simultaneously or independently, at different time intervals. The first group of items can comprise the same number of items as the second group of items or a different number of items. A pusher apparatus can be used to discharge the items onto the one or more output streams.

The manipulating step of the method can comprise rotating the carrier mechanism in a first direction from alignment with, or substantial alignment with, one or more input streams into alignment with a first output stream and rotating the carrier mechanism in the first direction into alignment with a second output stream. In addition to the rotating, the carrier mechanism can also be moved in a direction between the one or more input streams and the one or more output streams. The direction can be linear, non-linear, horizontal, vertical, and/or any other suitable direction. In one embodiment, items can be stored on the carrier mechanism, such as on the rods, for example, when the carrier mechanism is in the process of moving between the one or more input streams and the one or more output streams.

In one embodiment, items can be fed onto at least some of the rods from one or more input streams at a first speed (items per minute) and the items can be discharged from at least some of the rods onto one or more output streams at a second speed that is the same as or different than the first speed. Items can also be fed toward the carrier mechanism from different input streams at different speeds or at the same speed.

Another method of using the transfer mechanisms of the present disclosure can comprise feeding items onto or toward a carrier mechanism from one or more input streams, engaging void areas (e.g., void areas inside cores of sanitary tissue products) in the items with at least some of a plurality of rods extending from the carrier mechanism, radially expanding one or more of the rods, rotating the carrier mechanism relative to the one or more input streams into a position substantially aligned with one or more output streams, radially contracting the one or more of the rods, and discharging the items onto the one or more output streams using a pusher apparatus. The configuration of items in each of the input streams can be different than the configuration of items in each of the output streams. The items can be rolled sanitary tissue products having void areas inside cores thereof. The engaging step can comprise positioning the rods at least partially or fully through the void areas in the cores. The method can further comprise moving the carrier mechanism in a first direction and in a second direction during the step of engaging the void areas in the items with at least some of the plurality of rods.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, those of skill in the art will recognize that various other changes and modifications can be made without departing from the spirit and scope of the invention. It is therefore intended to cover in the appended claims all such changes and modifications that are within the scope of this invention.

What is claimed is:

1. A method of transferring sanitary tissue products comprising:
   feeding one or more separate input streams of sanitary tissue products toward a turret having a longitudinal axis and arms for engaging the sanitary tissue products, the arms being rotatable about the longitudinal axis;
   engaging at least one of the sanitary tissue products from the input stream(s) with the arms;
   rotating the arms away from the input stream(s) and into a position aligned with one or more separate output streams of sanitary tissue products wherein the total number of input streams of sanitary tissue products is different than the total number of output streams of sanitary tissue products; and
   feeding the sanitary tissue products onto the output stream(s).

2. The method of claim 1, comprising accelerating the rotatable arms between at least one of the input streams and at least one of the output streams.

3. The method of claim 1, wherein more than one of the sanitary tissue products are engaged from the input stream(s).

4. The method of claim 3, wherein the arms are radially expandable rods, and wherein the engaging step comprises radially expanding at least one of the rods, and the sanitary tissue products are engaged from an interior void by inserting the rods into the void and expanding.

5. The method of claim 4, wherein each of the sanitary tissue products have a core defined therein, and wherein the engaging step comprises positioning at least some of the rods at least partially through the cores.

6. The method of claim 1, wherein the arms are fixed to the turret and the turret rotates about the longitudinal axis.

7. The method of claim 1, wherein the feeding of sanitary tissue products onto the output stream is via a pusher mechanism.

8. The method of claim 1, wherein the arms have comprise a carrier mechanism, the carrier mechanism comprising a base and a plurality of rods.

* * * * *